Patented Nov. 30, 1948

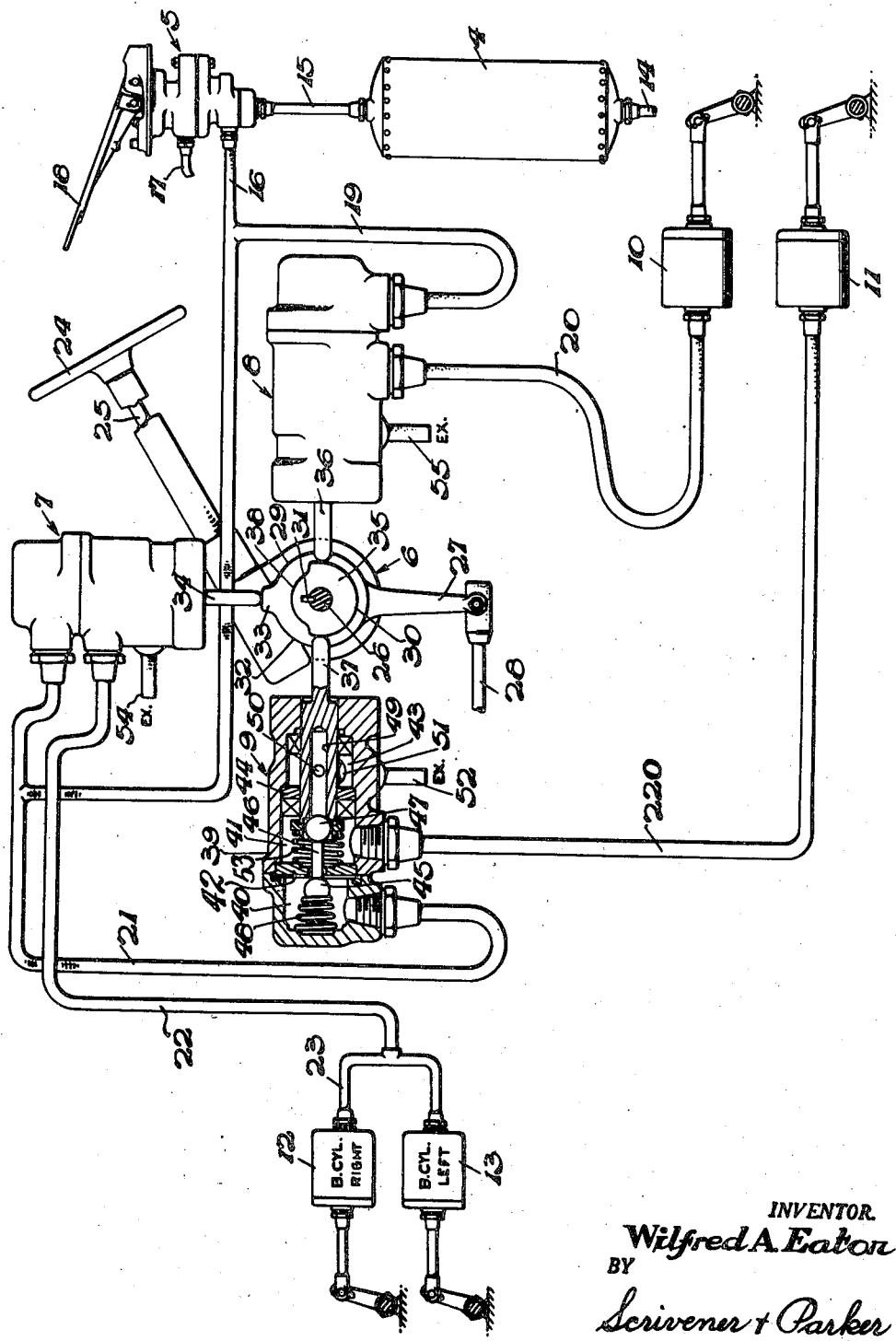

2,454,999

UNITED STATES PATENT OFFICE 2,454,999

COMBINED BRAKE AND STEERING MECHANISM

Wilfred A. Eaton, Oakville, Conn., assignor to Bendix-Westinghouse Automotive Air Brake Company, Elyria, Ohio, a corporation of Delaware Application May 23, 1946, Serial No. 671,833

4 Claims. (Cl. 180—18)

This invention relates to control mechanism, and more particularly to fluid pressure control mechanism for controlling the operation of the brakes on a vehicle in order to control the speed thereof as well as to assist the operator in steering the vehicle.

One of the objects of the present invention is to provide control means of the above type, so constituted as to permit the operator to have full control of all the brakes on the vehicle during normal operation.

Another object of the invention is to provide brake control mechanism, so constituted as to automatically prevent application of the rear brakes on one side or the other of the vehicle when the latter is turned from a straight path by a predetermined amount.

Yet another object of the invention is to provide means for automatically rendering the front brakes ineffective when the vehicle is turned in one direction or another from a straight path.

A still further object of the invention is to provide means controlled by the steering gear of the vehicle for controlling the flow of fluid pressure from the operator's brake control valve to the various brake actuators.

Another object of the invention is to provide brake control mechanism so constituted that the degree of braking power is controlled at all times by the regular brake control pedal of the vehicle and wherein application of braking power to the various wheel brakes is controlled by operation of the vehicle steering gear.

Other objects and novel features of the invention will appear more fully hereinafter from the following detailed description when taken in connection with the accompanying drawing, wherein a preferred embodiment of the invention is illustrated. It is to be expressly understood, however, that the drawing is employed for purposes of illustration only, and is not designed as a definition of the limits of the invention, reference being had for this purpose to the appended claims.

In the drawing, the single figure is a view, partially in section, of a control mechanism constructed in accordance with the principles of the present invention.

Referring to the drawing, the control mechanism includes in general, a fluid pressure supply reservoir 4, a brake valve 5, which may be constructed in accordance with the principles set forth in the patent to Roy S. Sanford and William J. Andres, No. 2,133,275, issued October 18, 1938, a steering gear 6 of conventional design, steering gear operated control valves 7, 8 and 9, rear brake actuators 10 and 11, and front brake actuators 12 and 13.

The reservoir 4 is supplied with fluid pressure from a suitable compressor, not shown, through a conduit 14, and is adapted to supply fluid pressure to the brake valve 5 through a conduit 15. The brake valve is provided with an outlet conduit 16, an exhaust conduit 17, and an operating pedal 18, and it will be understood on reference to the above referred to patent, that with the pedal in release position, the brake valve normally serves to prevent communication between conduits 15 and 16, and to permit communication between conduits 16 and 17. On depression of the pedal, the valve is effective to prevent communication between conduits 16 and 17, and to establish communication between conduits 15 and 16, thus establishing a pressure in the conduit 16 which is substantially proportional to the degree of movement of the control pedal from release position. The conduit 16 is connected with the right rear brake actuator 10 through a conduit 19 interconnected between conduit 16 and the valve 8, and a conduit 20 connected between the valve 8 and the actuator, the left rear brake actuator 11 being similarly connected to the outlet conduit 16 by means of a conduit 21 interconnected between conduit 16 and the control valve 9, and a conduit 22 connected between the control valve 9 and the actuator 11. In addition to the foregoing, the outlet conduit 16 is connected with the front brake actuators through the valve 7, which is connected with the conduit 16 by means of the conduit 21, and is connected with both of the front brake actuators through conduits 220 and 23. As will be more fully explained hereinafter, the valves 7, 8 and 9 are normally open, the result being that on depression of the brake pedal 18, fluid pressure is supplied to all of the front and rear brake actuators through the means above described at a pressure substantially proportional to the degree of depression of the brake pedal.

As heretofore stated, the steering gear mechanism 6 is of conventional design, a steering wheel 24 attached to a steering shaft 25 being connected with suitable reduction gearing, not shown, with a steering shaft 26 provided with a pitman arm or lever 27 adapted to be connected with the steering arm on the front wheels of the vehicle, not shown, by means of a drag link 28. The steering mechanism is so constructed, that on rotation of the steering wheel 24 in a clockwise direction, as viewed by the operator, the pitman arm 27 is rotated in a counterclockwise direction to turn the steering wheels of the vehicle to the right, while on rotation of the wheel 24 in opposite direction, the front wheels of the vehicle are correspondingly turned in the opposite direction to steer the vehicle to the left.

In order to control the operation of the valves 7, 8 and 9 in accordance with the operation of the above described steering gear, a pair of cams 29 and 30 are mounted on the shaft 26 and keyed to the shaft for rotation therewith by means of a key 31. The cam 29 is provided with a cylindrical portion 32, and a lobe 33 which normally engages and serves to raise an operating plunger 34 of the valve 7 when the steering gear is set to steer the vehicle in a straight line. The cam 30 is likewise provided with a cylindrical portion 35, the surface of which is normally in engagement with operating plungers 36 and 37 of the control valves 8 and 9 respectively, the plungers likewise being depressed to operate the valve when the cam is in the position shown. A cylindrical portion 38, of smaller diameter, is also provided on the cam 30, and so positioned that on counter-clockwise rotation of the pitman arm 27, the plunger 37 may be moved to the right, while on clockwise rotation of the pitman arm and cam, the plunger 37 will remain in the position shown, and the plunger 36 may be moved to the left.

The valves 7, 8 and 9 are preferably of identical construction, and with particular reference to the valve 9, shown in section, this valve includes a casing 39 provided with an inlet chamber 40, an outlet chamber 41 separated from the inlet chamber by means of a ported partition 42, and an exhaust chamber 43, separated from the outlet chamber by means of a partition 44. The flow of fluid pressure between the inlet chamber and the outlet chamber through the ported partition 42 is controlled by means of a normally open inlet valve 45 having a stem 46 connected at its right end with an exhaust valve 47, the inlet valve and the attached parts being urged to the right at all times by means of an inlet valve spring 48 interposed between the casing and the left end of the inlet valve. The valves are adapted to be operated by the valve operating plunger 37, and this plunger is provided with a bore 49, the left end of which is in engagement with the exhaust valve 47 with the parts in the position shown. Ports 50 formed in the wall of the bore serve to connect the latter with the exhaust chamber 43, and the latter chamber is connected with atmosphere by means of a port 51 and an exhaust conduit 52. In order to insure engagement of the right end of the plunger 37 with the surface of the cam 30 at all times, a spring 53 is interposed between the left end of the plunger and the right surface of the partition. Thus with the parts in the position shown, operation of the brake valve 5 to supply fluid pressure from the reservoir 4 to the conduit 16, will also supply fluid pressure to the rear brake actuator 11, through conduit 21, inlet chamber 40, the ported partition 42, the outlet chamber 41, and the conduit 220, movement of the pitman arm and the cam 30 in a counterclockwise direction through a predetermined angle, depending on the shape chosen for the cam, serving to permit movement of the plunger 37 to the right under the action of the spring 53 and the fluid pressure in the outlet chamber 41, in order to permit closing of the inlet chamber and opening of the exhaust valve. When this action occurs, the actuator 11 is connected with atmosphere through conduit 220, outlet chamber 41, bore 48, ports 50, port 51 and conduit 52, while the closed valve 45 prevents the flow of fluid pressure from the brake valve to the actuator through conduit 16, conduit 21, inlet chamber 40, ported partition 42, outlet chamber 41, and conduit 22.

It will be understood from the foregoing description, that with the parts in the position shown, the steering is set to steer the vehicle in a substantially straight path, and that operation of th brake valve 5 by the operator will serve to supply fluid pressure equally to all of the actuators in view of the fact that the inlet valves of the control valves 7, 8 and 9 are all in open position.

The above described brake control system is particularly adaptable for use on vehicles of the so-called half-track type, and it will be apparent that both the front and rear brakes are under the full control of the operator when the vehicle is moving in a straight path in order to provide maximum deceleration of the vehicle when required. It has been customary in the past to assist the operator in steering vehicles of this type by providing means for selectively applying the right or left rear brakes when the steering gear is operated to turn the vehicle respectively to the right or the left, and during operation of this type, it is considered undesirable to apply the front brakes of the vehicle when the angle of turn of the steering gear exceeds a predetermined value. To this end, the cam lobe 33 is so formed with respect to the cylindrical portion 32 of the cam as to permit downward movement of the plunger 34 of the valve 7 whenever the angle of turn of the pitman arm 27 in either direction exceeds a predetermined value, and when this action occurs, the control valve 7 is operated to prevent communication between conduits 21 and 22, and to establish communication between conduit 22 and an exhaust conduit 54. Thus the front brake actuators are connected with atmosphere through conduit 23, conduit 22, the valve mechanism 7 and the exhaust conduit 54, and the flow of fluid pressure to the actuators from the brake valve is prevented by the control valve 7.

With regard to the rear brake actuators, movement of the pitman arm in a counterclockwise direction to a predetermined angle will tend to steer the vehicle to the right, and will allow the plunger 37 to move to the right in order to connect the actuator 11 with atmosphere through the passages heretofore described, and will likewise operate the mechanism of the control valve 9 to prevent the flow of fluid pressure from the brake valve to the actuator 11. Due to the fact that portion 35 of the cam 30 is cylindrical, however, the position of the valve operating plunger 36 of the valve 8 will remain unchanged, and any desired degree of fluid pressure can be supplied to the actuator 10 by the operation of the brake valve 5 in order to assist the steering of the vehicle to the right, this pressure being supplied through conduit 16, conduit 19, control valve 8 and conduit 20. In like manner, on movement of the pitman arm in the opposite direction to steer the vehicle to the left, the inlet valve 45 of the control valve 9 remains open in order to permit the flow of fluid pressure to the actuator 11, while the operating plunger 36 of the valve 8 moves to the left, thus operating the valve mechanism to prevent communication between conduits 19 and 20 and to connect the actuator 10 with atmosphere through conduit 20, control valve 8, and an exhaust conduit 55 provided on the valve.

From the foregoing, it will be understood that simple and efficient means have been provided for permitting the operator to control the operation of the different brake actuators under all conditions of operation. When the vehicle is moving in a straight path, the degree of pressure supplied to all of the actuators may be accurately controlled by the operator in order to control the deceleration of the vehicle, and when the vehicle is steered to the right or left by turning the steering wheel through a predetermined angle, the front brake actuators are connected to atmosphere and disconnected from the brake valve, and fluid pressure may be supplied individually to one or the other of the rear brake actuators 10 and 11 at any desired pressure in order to assist in steering the vehicle. When the steering wheel is again returned to the straight ahead position, all of the brake actuators are again rendered effective to apply the brakes in accordance with the operation of the brake valve 5.

While one embodiment of the invention has been shown and described herein with considerable particularity, it is to be understood that the same is not limited thereto, but may be embodied in various forms as will be well understood by those skilled in the art. Reference will, therefore, be had to the appended claims for a definition of the limits of the invention.

What is claimed is:

1. In a braking system for a vehicle having a pair of front brakes, a pair of rear brakes, and a steering mechanism, a fluid pressure actuator for each of said brakes, pedal controlled means for conducting fluid pressure to all of said actuators including a valve device for each of the rear brake actuators, and a valve device for both of the front brake actuators, each of said valve devices including a valve resiliently urged toward closed position, and rotatable cam means controlled by movement of the steering mechanism for positively maintaining said valves of all of said valve devices in open position when said mechanism is moved to straight-ahead steering position, and for selectively allowing said valves of the first named valve devices to close depending upon the direction of turn of the steering mechanism, said cam means being constructed and arranged to allow the valve of the second named valve device to close in response to movement of the steering mechanism in either direction from straight-ahead steering position.

2. In a braking system of the character set forth in claim 1 wherein each of said valve devices includes a reciprocable actuating member having one end thereof in engagement with said cam means, and the other end thereof operatively connected with the valve of the valve device, together with resilient means constantly urging said member into engagement with said cam means.

3. In a braking system of the character set forth in claim 2 wherein said rotatable cam means includes a raised portion engaged with the actuating members of the first named valve devices when the steering mechanism is moved to straight-ahead position, and a reduced portion selectively engageable with the last named actuating members when the steering mechanism is moved in either direction from straight-ahead steering position.

4. In a braking system of the character set forth in claim 3 wherein said rotatable cam means includes also a cylindrical portion engageable with the actuating member of the second named valve device when the steering mechanism is moved in either direction from straight-ahead position, and an outwardly projecting portion engageable with the last named actuating member when the steering mechanism is moved to straight ahead position.

WILFRED A. EATON.

REFERENCES CITED

The following references are of record in the file of this patent:

UNITED STATES PATENTS

| Number | Name | Date |
|---|---|---|
| 1,771,057 | Pentz | July 22, 1930 |
| 2,133,275 | Andres et al. | Oct. 18, 1938 |
| 2,254,902 | Milster | Sept. 2, 1941 |
| 2,346,175 | Matson | Apr. 11, 1944 |
| 2,367,194 | Boldt | Jan. 16, 1945 |